United States Patent
Gazit et al.

(10) Patent No.: US 9,733,348 B2
(45) Date of Patent: Aug. 15, 2017

(54) VEHICLE RADAR WITH BEAM ADJUSTMENT

(71) Applicant: GM GLOBAL TECHNOLOGY OPERATIONS LLC, Detroit, MI (US)

(72) Inventors: Ran Y. Gazit, Ra'Anana (IL); Igal Bilik, Revohot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 14/323,433

(22) Filed: Jul. 3, 2014

(65) Prior Publication Data

US 2016/0003938 A1    Jan. 7, 2016

(51) Int. Cl.
*G01S 13/02* (2006.01)
*G01S 7/40* (2006.01)
*G01S 13/93* (2006.01)

(52) U.S. Cl.
CPC ............. *G01S 13/02* (2013.01); *G01S 7/40* (2013.01); *G01S 13/931* (2013.01); *G01S 2007/4034* (2013.01)

(58) Field of Classification Search
CPC .................. G01S 13/02; G01S 13/931; G01S 2007/4034; G01S 7/40
USPC ........................................................ 342/81
See application file for complete search history.

(56) References Cited

U.S. PATENT DOCUMENTS

| | | | |
|---|---|---|---|
| 5,023,617 A * | 6/1991 | Deering | B60K 31/0075 342/70 |
| 5,617,085 A * | 4/1997 | Tsutsumi | B60Q 9/008 180/167 |
| 6,686,869 B2 | 2/2004 | Kim | |
| 2003/0028291 A1* | 2/2003 | Matsuura | G01S 7/4802 701/1 |
| 2004/0145513 A1* | 7/2004 | Katayama | G01S 7/032 342/70 |
| 2004/0150550 A1* | 8/2004 | Shouno | G01S 7/35 342/70 |
| 2007/0222662 A1* | 9/2007 | Toennesen | G01S 13/48 342/27 |
| 2008/0040004 A1* | 2/2008 | Breed | B60R 21/0134 701/45 |
| 2013/0154871 A1* | 6/2013 | Gaboury | G01S 7/4026 342/82 |

FOREIGN PATENT DOCUMENTS

CN    102540178 A    7/2012
WO    2014056102 A1    4/2014

OTHER PUBLICATIONS

State Intellectual Property Office of the People's Republic of China, Office Action in Chinese Patent Application No. 201510383668.3 dated Apr. 1, 2017.

* cited by examiner

*Primary Examiner* — Timothy A Brainard
(74) *Attorney, Agent, or Firm* — Lorenz & Kopf, LLP

(57) ABSTRACT

Methods and systems are provided for controlling a radar system of a vehicle. Sensor information pertaining to an environment for the vehicle is received from a first sensor as the vehicle is operated. A beam of the radar system is adjusted by a processor based on the sensor information.

20 Claims, 6 Drawing Sheets

VEHICLE RADAR WITH BEAM ADJUSTMENT

TECHNICAL FIELD

The present disclosure generally relates to vehicles, and more particularly relates to methods and radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. While radar systems are generally useful for such vehicle features, in certain situations existing radar systems may have certain limitations.

Accordingly, it is desirable to provide techniques for radar system performance in vehicles, for example that may be tailored to different environments in which the vehicle may be operating. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling a radar system of a vehicle. The method comprises receiving sensor information via a sensor pertaining to an environment for the vehicle as the vehicle is operated and adjusting a beam of the radar system based on the sensor information.

In accordance with an exemplary embodiment, a control system for a radar system of a vehicle is provided. The control system comprises a sensor and a processor. The sensor is configured to provide sensor information pertaining to an environment for the vehicle as the vehicle is operated. The processor is coupled to the sensor, and is configured to adjust a beam of the radar system based on the sensor information.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
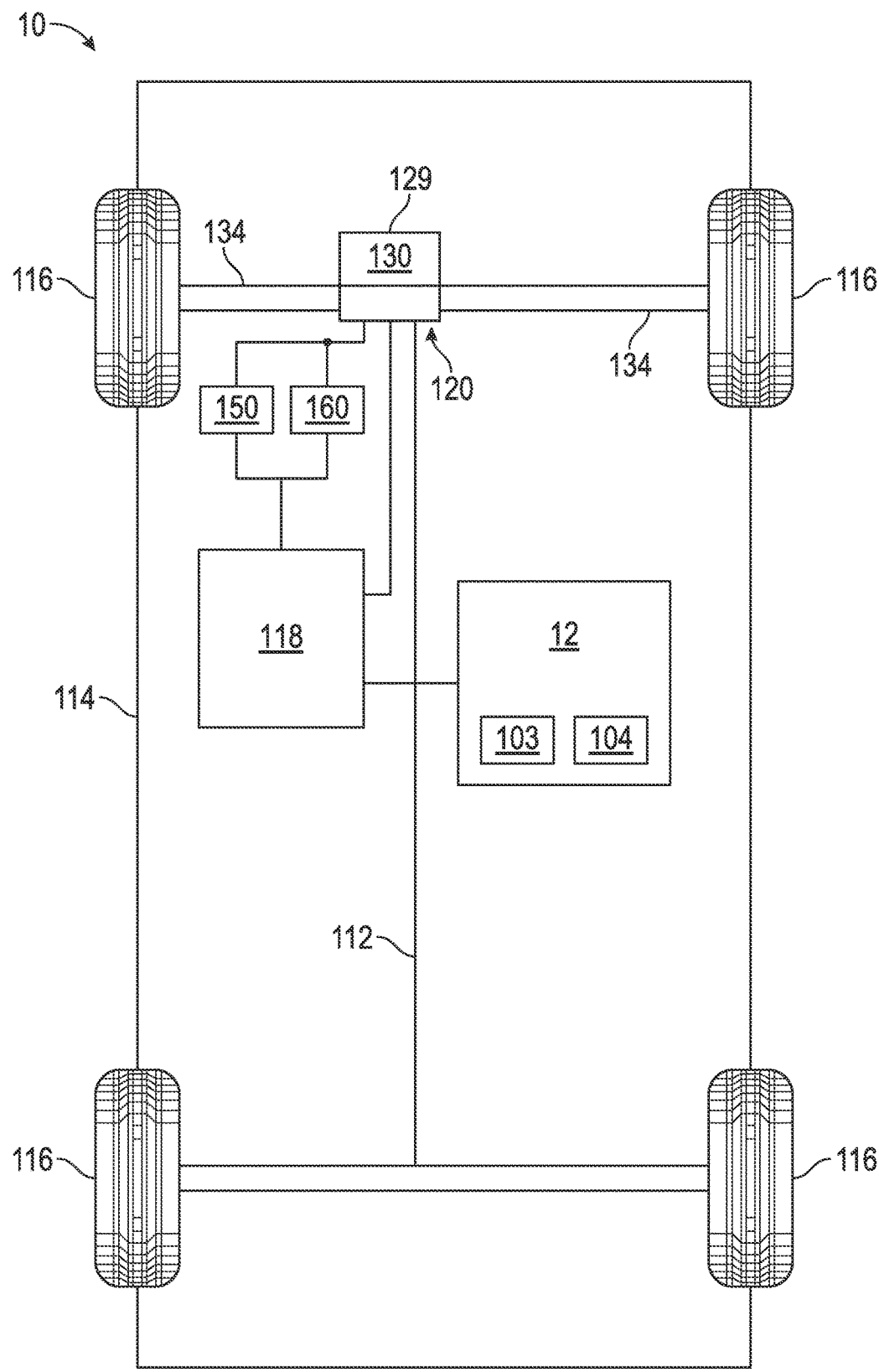
FIG. 1 is a functional block diagram of a vehicle having a control system, including a radar system, in accordance with an exemplary embodiment.
Figure 7:
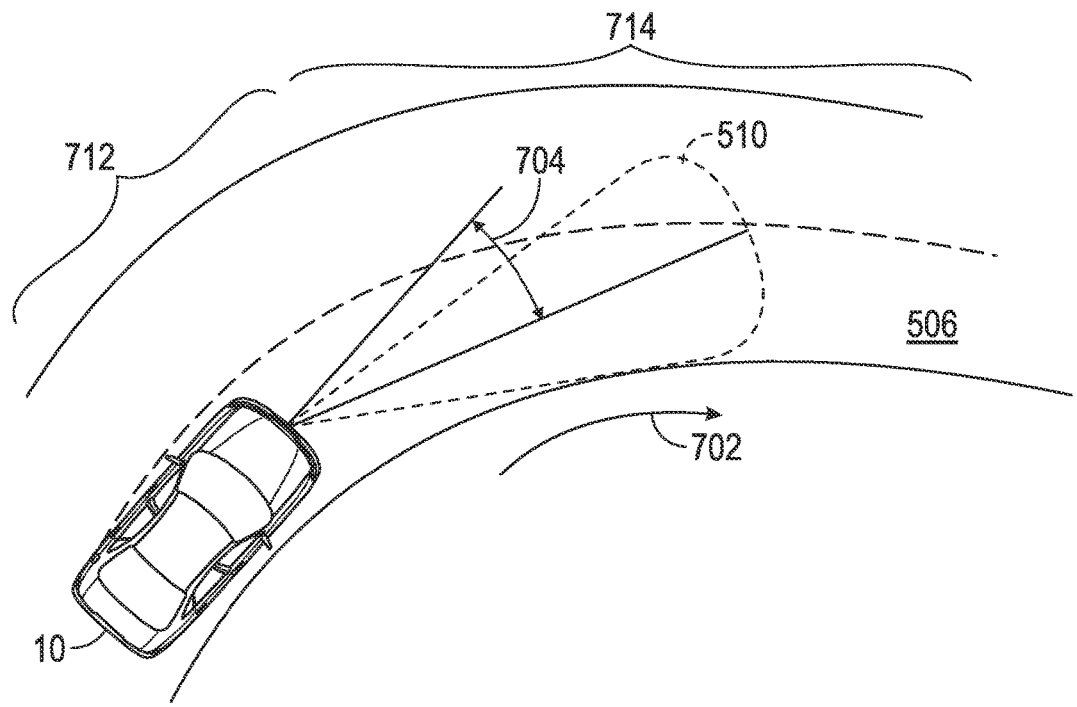
FIG. 7 provides an illustration of a step of the process of FIG. 4, namely, the step of adjusting a beam of the radar system based on a curvature of a road in which the vehicle is travelling, in accordance with an exemplary embodiment.
Figure 8:
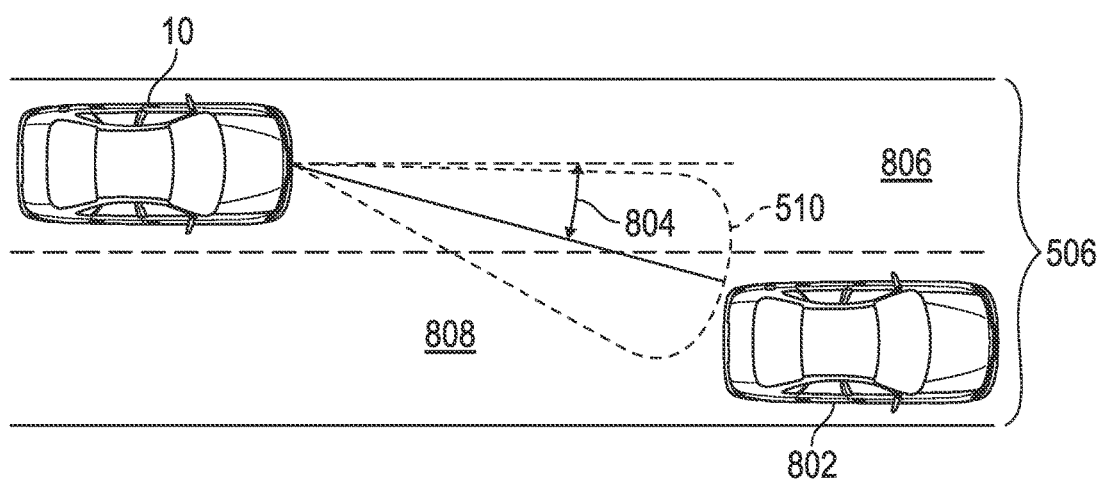
FIG. 8 provides an illustration of a step of the process of FIG. 4, namely, the step of adjusting a beam of the radar system based on an object identified in proximity to the vehicle, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that adjusts a beam of the radar system 103 based on an environment of the vehicle 10 as it is operating, for example based on a tilt of the vehicle 10 (FIG. 5), an incline of a road on which the vehicle 10 is travelling (FIG. 6), a curvature of the road (FIG. 7), and/or another object identified in proximity to the vehicle 10 (FIG. 8).

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114. In various embodiments the vehicle 10 may differ from that depicted in FIG. 1. For example, in certain embodiments the number of wheels 116 may vary. By way of additional example, in various embodiments the vehicle 10 may not have a steering system, and for example may be steered by differential braking, among various other possible differences.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver. Similar to the discussion above regarding possible variations for the vehicle 10, in certain embodiments the vehicle 10 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1). Similar to the discussion above regarding possible variations for the vehicle 10, in certain embodiments steering, braking, and/or acceleration can be commanded by a computer instead of by a driver (in one such embodiment, a computer of the vehicle may use input from the radar system to steer, brake, and/or accelerate the vehicle).

The radar control system 12 is mounted on the chassis 112. As mentioned above, the radar control system 12 adjusts a beam of the radar system 103 based on an environment of the vehicle 10 as it is operating, for example based on a tilt of the vehicle 10, an incline of a road on which the vehicle 10 is travelling, a curvature of the road, and/or another object identified in proximity to the vehicle 10 (e.g., as discussed further below in connection with FIGS. 5-8). In one example, the radar control system 12 provides these functions in accordance with the method 400 described further below in connection with FIG. 4.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
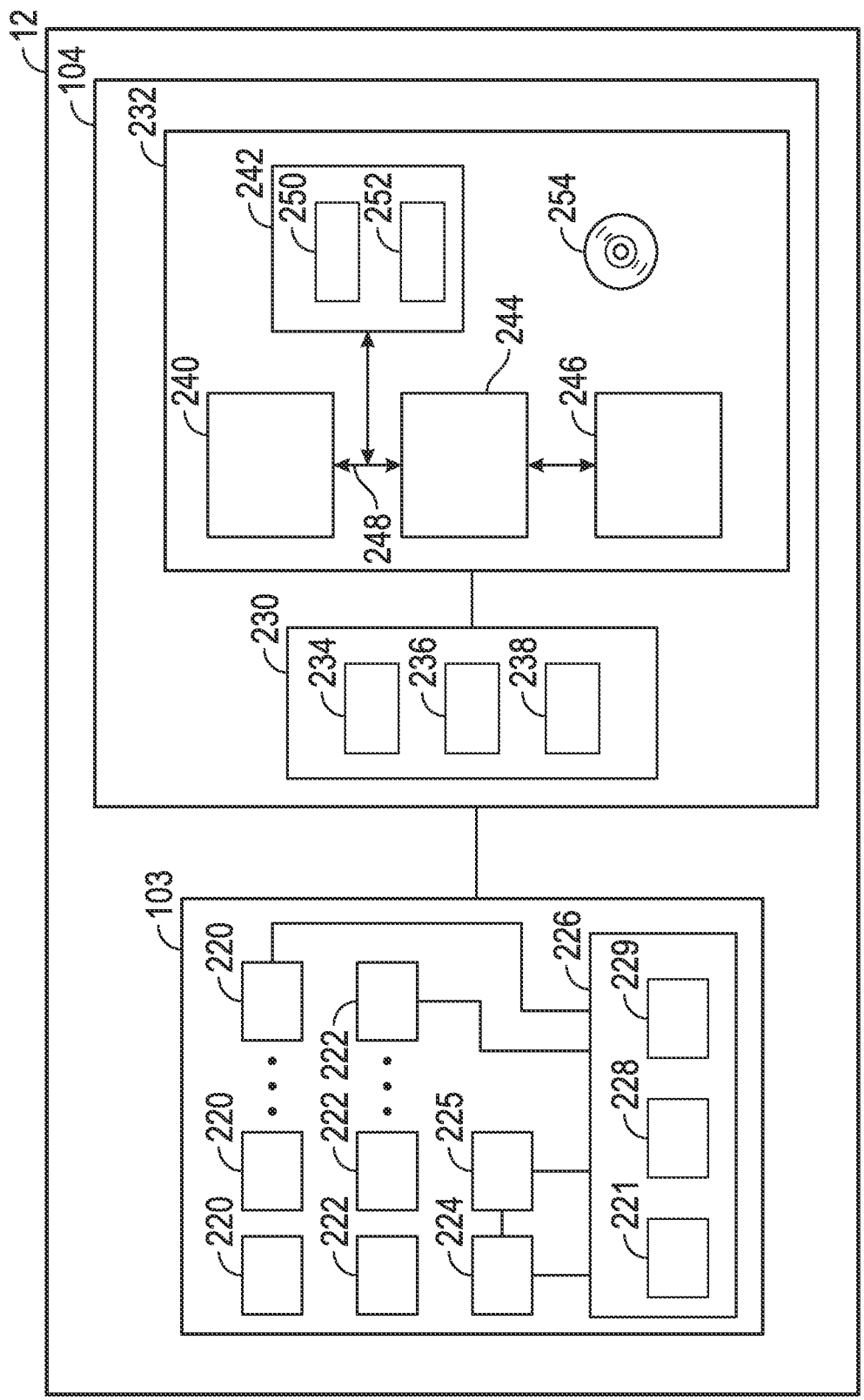
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, an interface 224, a memory 225, and a processing unit 226. In one embodiment, the radar system 103 comprises a multiple input, multiple output (MIMO) radar system with multiple transmitters (also referred to herein as transmission channels) 220 and multiple receivers (also referred to herein as receiving channels) 222. In other embodiments, the radar system 103 may comprise any number of different types of radar systems, including, among others, non-MIMO radar systems having a single transmitter and/or that use standard beam forming with multiple receiving antennas.

The transmitters 220 transmit radar signals for the radar system 103. The transmitted radar signals collectively form a beam that is transmitted by the radar system 103 for detecting objects (e.g. other vehicles, pedestrians, trees, rocks, debris, road characteristics, and so on). As described in greater detail further below, the beam is adjusted by a processor (such as the processing unit 226 and/or the processor 240 described further below) by adjusting a phase and/or amplitude of the transmitted and/or received radar signals based on the environment for the vehicle 10 as it is operated (such as a tilt of the vehicle 10, a geographic location of the vehicle 10, an incline of the road on which the vehicle 10 is travelling, a curvature of the road in which the vehicle 10 is travelling, and/or an object identified in proximity to the vehicle 10). After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
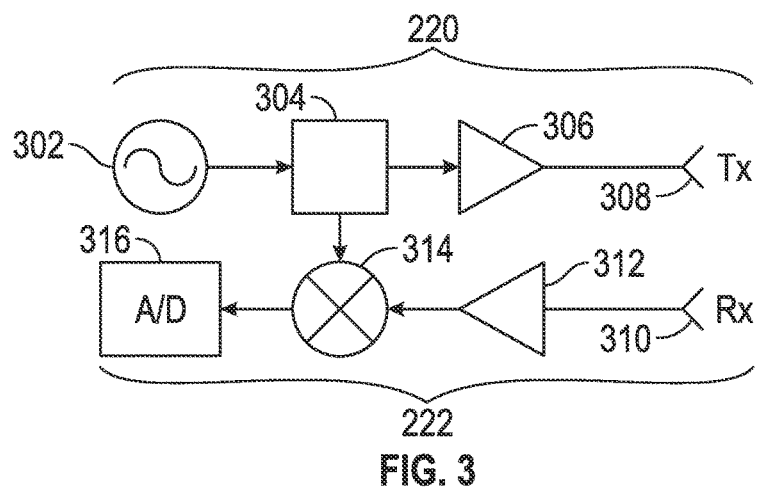
FIG. 3 is a functional block diagram of a transmission channel and a receiving channel of the radar system of FIGS. 1 and 2, in accordance with an exemplary embodiment.

With reference to FIG. 3, a representative one of the transmission channels 220 is depicted along with a respective one of the receiving channels 222 of the radar system of FIG. 3, in accordance with an exemplary embodiment. As depicted in FIG. 3, each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna (e) 310, amplified by the amplifier(s) 312, mixed by the mixer(s) 314, and digitized by the sampler(s)/digitizer(s) 316.

Returning to FIG. 2, the radar system 103 also includes, among other possible features, the interface 224, the memory 225, and the processing unit 226. The interface 224 (e.g., one or more communication transceivers) receives information from one or more sensors (such as the sensor array 230 of FIG. 2, described further below) pertaining to an environment for the vehicle 10 during vehicle operation (such as a tilt of the vehicle 10, a geographic location of the vehicle 10, an incline of the road on which the vehicle 10 is travelling, a curvature of the road in which the vehicle 10 is travelling, and/or objects identified in proximity to the vehicle 10). Also as discussed further below, in certain embodiments the one or more sensors may be part of the radar system 103. In certain embodiments, such functions may be performed, in whole or in part, by an interface 244 of a computer system 232 (discussed further below). The memory 225 stores the information received by the interface 224 and/or the interface 244 (e.g. as received from the sensor array 230), along with information pertaining to data from the received radar signals via the receivers 222. In certain embodiments, such functions may be performed, in whole or in part, by a memory 242 of the computer system 232 (discussed further below).

The processing unit 226 processes the information obtained by the interface 224 (and/or the interface 244) pertaining to the environment for the vehicle 10, and provides for the adjustment of a beam of the radar system 103 via adjustment of a phase and/or amplitude of the transmitted and/or received radar signals based on the environment for the vehicle 10 as it is operated (such as a tilt of the vehicle 10, a geographic location of the vehicle 10, an incline of the road on which the vehicle 10 is travelling, a curvature of the road in which the vehicle 10 is travelling, and/or objects identified in proximity to the vehicle 10) The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In one embodiment, the processing unit 226 includes three functional modules, namely, (i) a scene analysis module 227 that evaluates the information from the sensor array 230 and/or the receivers 222 in making identifications and determinations regarding the environment for the vehicle 10 as it is operated; (ii) a beam steering module 228 that determines appropriate adjusts for the radar system beam based on the environment and that provides instructions for such beam adjustment; and (iii) a radar central processing unit (CPU) module 229 that implements the instructions from the beam steering module and that controls general operation of the radar system 103 (including the transmission of radar signals). In various embodiments, these functions may be performed by one processor or multiple processors of the processing unit 226. In addition, in certain embodiments, such functions may be performed, in whole or in part, by the processor 240 of the computer system 232 (discussed further below).

In certain embodiments, the radar system 103 may include multiple interfaces 224, memories 225, and/or processing units 226, working together or separately, as is also realized by those skilled in the art. In addition, it is noted that in certain embodiments, the functions of the interface 224, the memory 225, and/or the processing unit 226 may be performed in whole or in part by one or more other memories, interfaces, and/or processors disposed outside the radar system 103, such as the memory 242, the interface 244, and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of objects, and implements appropriate vehicle actions based on this information. The controller 104 generally performs these functions in accordance with the method 400 discussed further below in connection with FIGS. 4-9.

As depicted in FIG. 2, the controller 104 comprises a sensor array 230 and a computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

In the depicted embodiment, the sensor array 230 includes an inertial measurement unit (IMU) 234, a geographic sensor unit 236, and one or more detection units 238, described below. In one embodiment, each of the sensors of the sensor array 230 is housed within the body 114 of the vehicle 10 of FIG. 1. As depicted in FIG. 2, in certain embodiments the sensor array 230 may be disposed, in whole or in part, separate from the radar system 103. In other embodiments, the sensor array 230 may be disposed, in whole or in part, within or as part of the radar system 103.

The IMU 234 measures the tilt of the vehicle. In one example, the vehicle's tilt comprises an angle in which the vehicle 10 (front to rear) is facing with respect to the roadway in front of the vehicle 10. The vehicle 10 may experience tilt, for example, during braking. In certain embodiments, the IMU 234 also determines a rate of tilt of the vehicle 10. Also in certain embodiments, the IMU 234 includes one or more accelerometers and/or gyroscopes. In various embodiments, the vehicle tilt information from the IMU 234 is stored in the memory 225 of the radar system 103 (and/or the memory 242 of the computer system 232, described further below), and is used by the processing unit 226 of the radar system 103 (and/or the processor 240 of the computer system 232, described further below) for adjustment of a phase and/or amplitude of the transmitted and/or received radar signals, to thereby adjust the beam of the radar system 103. It will be appreciated that this can be performed in any number of radar system configurations in which multiple antennas are used.

The geographic sensor unit 236 provides information as to a geographic location of the vehicle 10 and/or the road on which the vehicle 10 is travelling. In one embodiment, the geographic sensor unit 236 comprises a global positioning system (GPS) and/or one or more components thereof. In certain embodiments, the geographic sensor unit 236 may be part of a navigation and/or infotainment/entertainment system. In addition, in one embodiment, the geographic sensor unit 236 receives and/or provides map information pertaining to the roadway (e.g., that includes information as to the incline and curvature of an upcoming segment of the roadway that is soon to be encountered by the vehicle 10). In various embodiments, the geographic information from the geographic sensor unit 236 is stored in the memory 225 of the radar system 103 (and/or the memory 242 of the computer system 232), and is used by the processing unit 226 of the radar system 103 (and/or the processor 240 of the computer system 232) for adjustment of a phase and/or amplitude of the transmitted and/or received radar signals, to thereby adjust the beam of the radar system 103.

The detection units 238 detect objects (e.g. other vehicles, pedestrians, trees, rocks, debris, road characteristics, and so on) in proximity to the vehicle 10. In certain embodiments, the detection units 238 also detect features of the road in which the vehicle 10 is travelling (e.g. an incline in the road and/or a curvature in the road). Also in certain embodiments, the detection units 238 comprise one or more cameras, light detection and ranging (LIDAR) units, and/or other radar systems (e.g. other than the radar system 103 of FIG. 2). In various embodiments, the information from the detection units 238 is stored in the memory 225 of the radar system 103 (and/or the memory 242 of the computer system 232, described further below), and is used by the processing unit 226 of the radar system 103 (and/or the processor 240 of the computer system 232, described further below) for adjustment of a phase and amplitude of the transmitted or received radar signals, to thereby adjust the beam of the radar system 103.

As depicted in FIG. 2, the computer system 232 includes a processor 240, a memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 adjusts a wave form of the transmitted signals, to thereby adjust the beam of the radar system 103, based on the environment for the vehicle 10 as determined based on the information received from the sensor array 230 as well as from the radar signals received via the receivers 222 of the radar system 103. In another embodiment, the processor 240 performs a beam forming algorithm on the received data by applying differential phase shifts and amplitude modulation, to thereby adjust the beam of the radar system 103. During operation, the processor 240 executes one or more programs 250 contained within the memory 242 and, as such, controls the general operation of the controller 104 and the computer system 232, generally in executing the processes described herein, such as those of the method 400 described further below in connection with FIGS. 4-9.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, the information obtained from the sensor array 230, as well as information pertaining to returned radar signals for the radar system 103, and various thresholds used as criteria for adjustment of the beam of the radar system 103) for use in making the determinations.

The bus 248 serves to transmit programs, data, status and other information or signals between the various components of the computer system 232. The interface 244 allows communication to the computer system 232, for example from a system driver and/or another computer system, and can be implemented using any suitable method and apparatus. In one embodiment, the interface 244 receives information from the various sensors of the sensor array 230 as to the environment for the vehicle 10 as the vehicle 10 is being operated. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-9. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4:
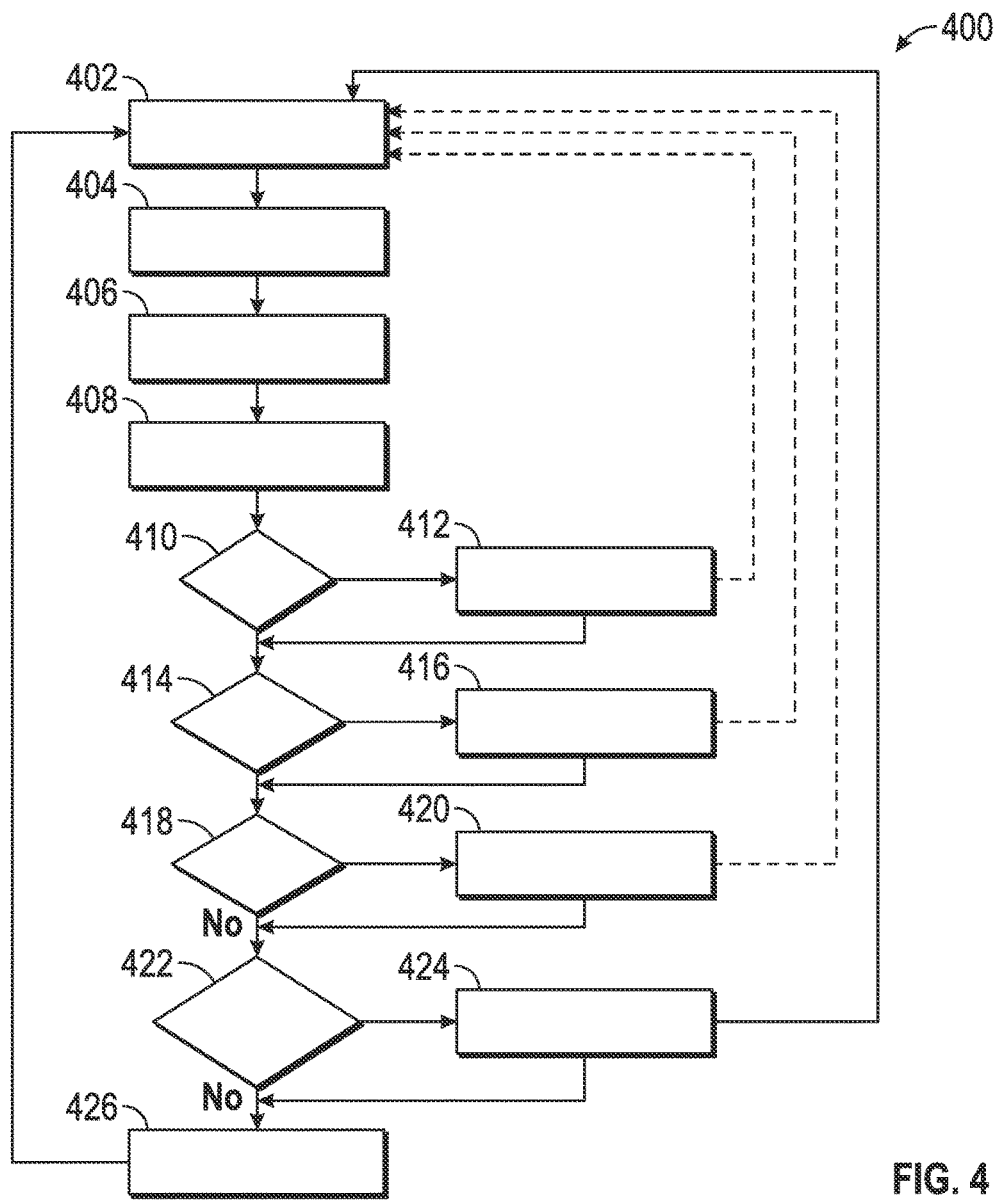
FIG. 4 is a flowchart of a method for controlling a radar system, which can be used in connection with the vehicle of FIG. 1, the control system of FIGS. 1 and 2, and the radar system of FIGS. 1-3, in accordance with an exemplary embodiment.
Figure 9:
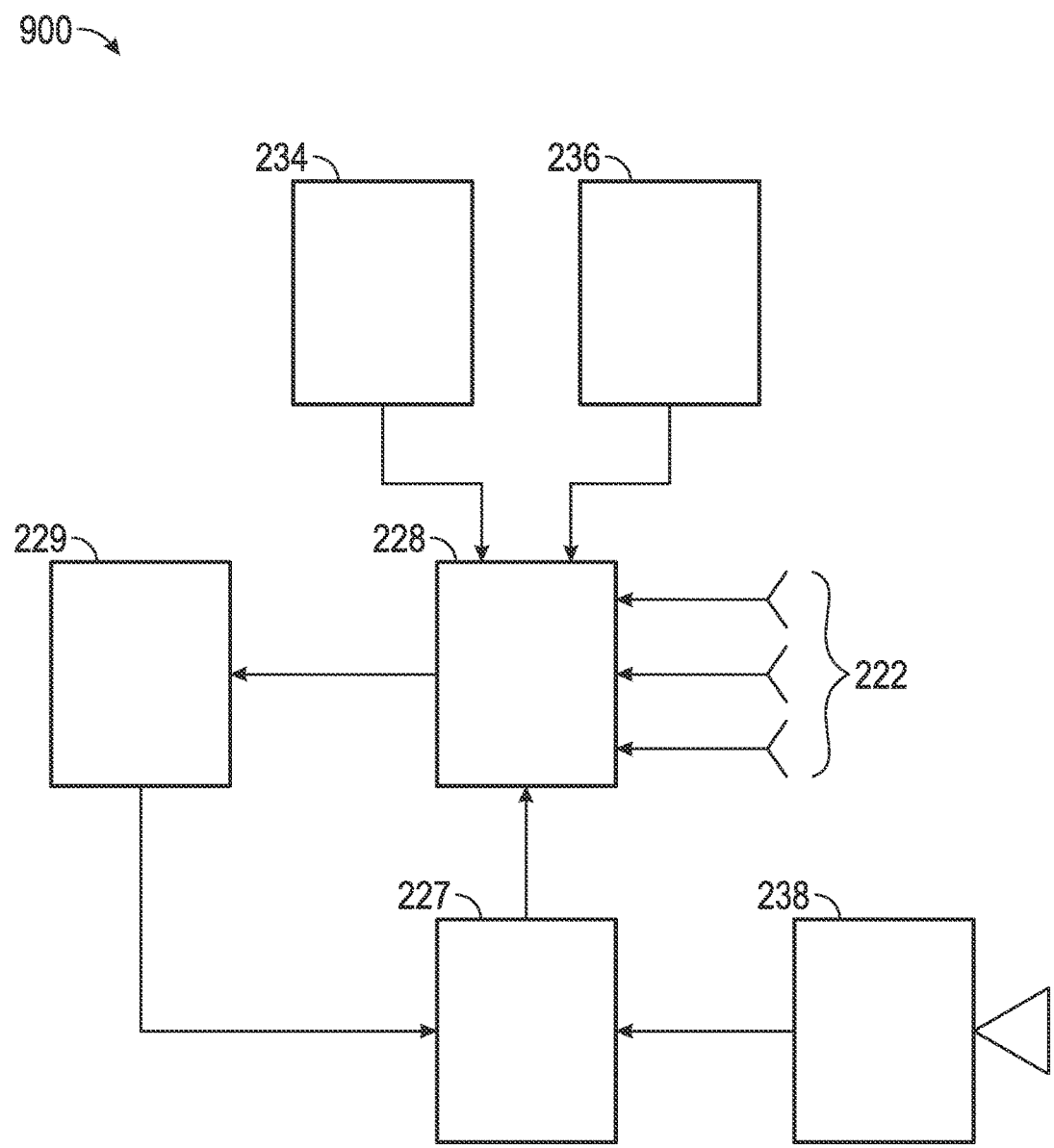
FIG. 9 provides a flow diagram corresponding to implementation of the process of FIG. 4 in connection with the control system of FIGS. 1-3, in accordance with an exemplary embodiment.

FIG. 4 is a flowchart of a method 400 for implementing a radar system of a vehicle, in accordance with an exemplary embodiment. The method 400 can be implemented in connection with the vehicle 10 of FIG. 1 and the radar control system 12 of FIGS. 1-3, in accordance with an exemplary embodiment. The method 400 is also discussed below in connection with FIGS. 5-9, which provide illustrative examples of various steps of the method 400 (FIGS. 5-8) as well as an exemplary architecture flow diagram for the method 400 (FIG. 9).

As depicted in FIG. 4, information pertaining to a tilt of the vehicle 10 is obtained at 402. In one example, the information of 402 comprises an angle in which the vehicle 10 (front to rear) is facing with respect to the roadway in front of the vehicle 10. With reference to FIG. 5, in one example the tilt of the vehicle 10 is represented by angle 508 made between the vehicle 10 and the road 506 in which the vehicle 10 is travelling. In one embodiment, a rate of change of the vehicle tilt over time is also obtained. In one embodiment, the vehicle tilt and/or the rate of change of the vehicle tilt are measured by the IMU 234 of FIG. 2. In certain embodiments, the vehicle tilt and/or the rate of change thereof may be determined by a processor (such as the processing unit 226 and/or the processor 240 of FIG. 2) based on information provided by the IMU 234.

Figure 6:
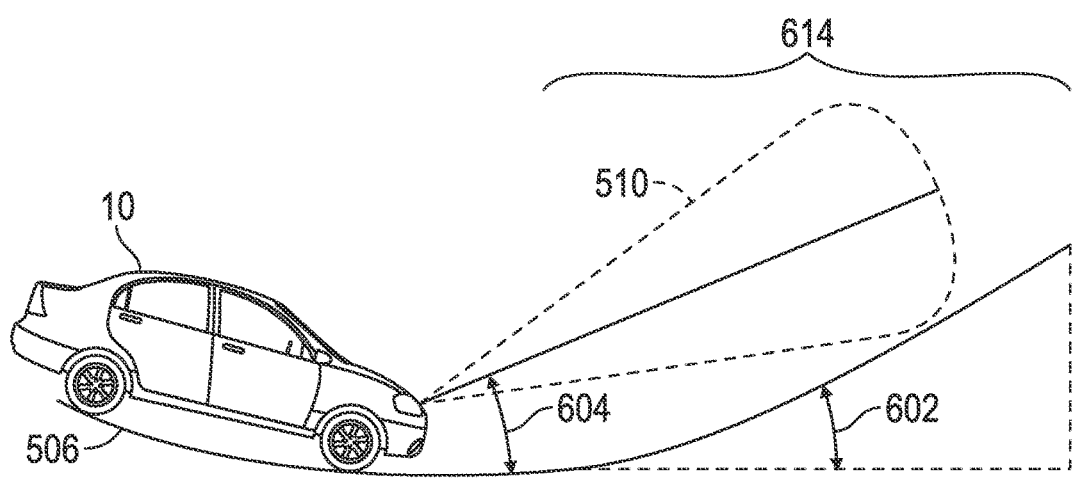
FIG. 6 provides an illustration of a step of the process of FIG. 4, namely, the step of adjusting a beam of the radar system based on an incline of a road in which the vehicle is travelling, in accordance with an exemplary embodiment.

Geographic data is obtained at 404. In one example, the information of 404 comprises one or more characteristics pertaining to a road in which the vehicle 10 is travelling. In one embodiment, the characteristic(s) of 404 comprise an incline of the road (e.g., a vertical of the road in an upcoming stretch of road, up or down, with respect to the local horizon). With reference to FIG. 6, in one example the incline of the vehicle 10 is represented by angle 602 made between an upcoming segment 614 (i.e., in front of the vehicle 10) and the local horizon.

In addition, in one embodiment, the characteristic(s) of 404 comprise a curvature of the road (e.g., a curvature or angle of an upcoming stretch of road). With reference to FIG. 7, in one example the curvature represents a curve 702 for an upcoming segment 714 (i.e., in front of the vehicle 10) and a current segment 712 (i.e., in which the vehicle 10 is currently positioned) of the road 506 in which the vehicle 10 is travelling.

In various embodiments, the geographic data and associated road characteristics (e.g. the incline and/or curvature of the road) may be obtained via the geographic sensor unit 236 of FIG. 2 (e.g., via a GPS device). The geographic data and associated characteristics may also be obtained via one or more detection units 238 of FIG. 2, e.g. via a camera and/or LIDAR unit onboard the vehicle. In addition, in certain embodiments a processor (such as the processing unit 226 and/or the processor 240 of FIG. 2) may determine the road characteristics (e.g. the incline and/or curvature of the road) based on the data provided by the geographic sensor unit 236 and/or the detection units 238.

At 406 information is obtained pertaining to one or more objects (e.g. other vehicles, pedestrians, trees, rocks, debris, road characteristics, and so on) that are disposed in proximity to the vehicle 10 and/or the road on which the vehicle 10 is travelling. The vehicle 10 is also referred to herein as the host vehicle. In one example, the information of 406 comprises an identification of such detected object(s) along with a relative location and/or relative location vector between the object and the host vehicle 10. With reference to FIG. 8, in one example the object 802 is identified with respect to angle 804 formed between the object 802 and a longitudinal axis of the host vehicle 10. While the object 802 is depicted as a vehicle in FIG. 8, it will be appreciated that in various embodiments the object 802 may take various different forms (such as, by way of example, a pedestrian, a bicycle, an animal, a tree, a boulder, debris, and so on). In addition, while the object 802 is depicted as being in a different lane (808) as compared with the lane (806) of the host vehicle 10, it will be appreciated that in various embodiments the object 802 could be in the same lane as the host vehicle 10. In one embodiment, the information of 406 may be obtained by the detection units 238 of FIG. 2. Also in certain embodiments, the information of 406 may be obtained based on return signals of the radar system 103 itself (namely, by the receivers 222 of FIG. 2). In addition, in certain embodiments a processor (such as the processing unit 226 and/or the processor 240 of FIG. 2) may identify the object and/or make determinations regarding the object based on the data provided by the detection units 238 and/or the radar system 103.

In certain embodiments, further analysis of the data of 402-406 is performed at 408. For example, in certain embodiments, determinations are made as to the magnitude and/or rate of change of the vehicle tilt of 402, the scope and proximity of the road characteristics of 404 (e.g. incline and/or curvature of the road) with respect to the vehicle, and/or the characteristics (e.g. size, shape, movement, and/or proximity to the vehicle) of the objects detected at 406. In one embodiment, the analysis of 408 is performed by a processor, such as the processing unit 226 and/or the processor 240 of FIG. 2.

A determination is made at 410 as to whether the vehicle tilt of 402 and/or 408 is greater than a predetermined threshold. With reference to FIG. 5, in one embodiment, the determination at 410 is whether the angle 508 is greater than a predetermined threshold. In an alternate embodiment, the determination of 410 pertains to whether a rate of change of the vehicle tilt is greater than a predetermined threshold. In one embodiment, this determination is made by a processor, such as the processing unit 226 and/or the processor 240 of FIG. 2, using a predetermined threshold stored in the memory 225 and/or the memory 242 (e.g., as a stored value 252) of FIG. 2. In one embodiment, the tilt of the vehicle is continuously measured and monitored, and the radar beam direction is continuously changed in order to keep it within desired field of view where the potential obstacles are expected both in elevation and azimuth direction.

If the vehicle tilt (or, in certain embodiments, the rate of change of the vehicle tilt) is greater than the predetermined threshold, then the beam of the radar system 103 is adjusted at 412. In various embodiments, the beam is adjusted by adjusting an amplitude and/or phase of the transmitted radar signals, the received radar signals, or both of the radar system 103 via instructions provided by a processor (such as the processing unit 226 and/or the processor 240 of FIG. 2) so that the beam is formed in parallel with the upcoming segment of the road in which the vehicle 10 is travelling.

As used throughout this Application, the "adjusting" of the "beam" refers to a steering of the beam via an adjustment of the direction of the beam. Also in one embodiment, the change in the amplitude and/or phase is implemented in a differential fashion in connection with multiple radar elements (e.g., multiple transmitters and/or multiple receivers), to thereby, in the aggregate, adjust the direction of the beam. For example, in one embodiment, the amplitude and/or phase of the radar signals are modified in different amounts for the different radar elements (e.g., multiple transmitters and/or multiple receivers), to thereby attain the desired change in direction (i.e. "adjustment") of the beam.

Figure 5A:
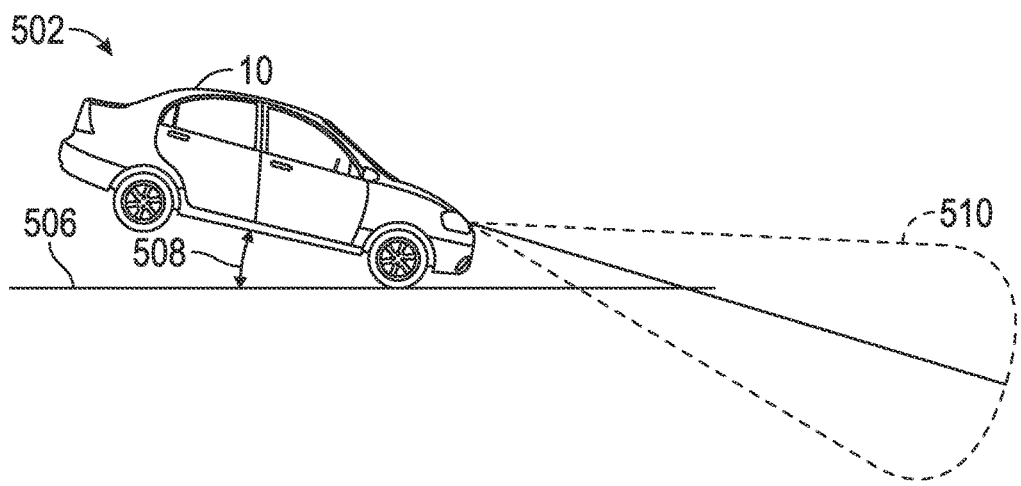
FIG. 5 (including components FIG. 5A and FIG. 5B) provides an illustration pertaining to a step of the process of FIG. 4, namely, the step of adjusting a beam of the radar system based on a tilt of the vehicle, in accordance with an exemplary embodiment (specifically, FIG. 5B provides an illustration in which the beam is adjusted, and FIG. 5A provides, for comparison purposes, an illustration in which the beam is not adjusted, in accordance with an exemplary embodiment)
Figure 5B:
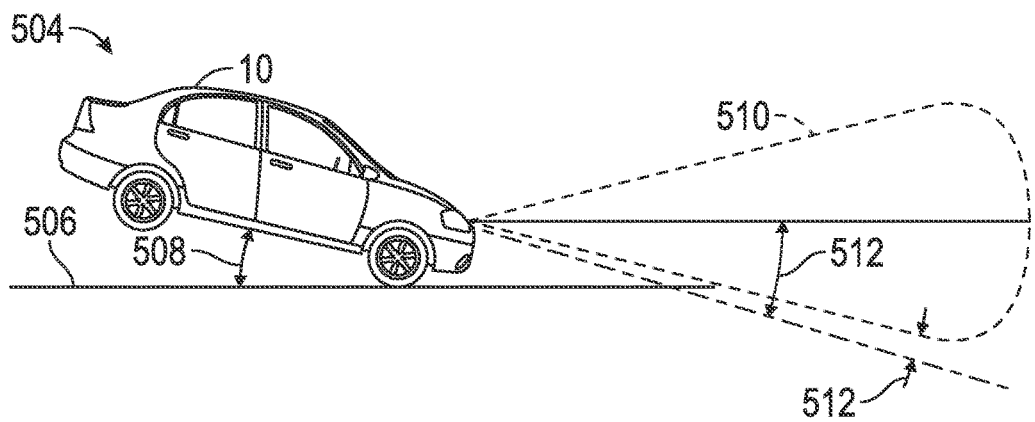

With reference to FIG. 5 (including sub-components FIG. 5A and FIG. 5B), two exemplary illustrations are provided. A first illustration 502 illustrates a direction of the beam 510 under a typical radar system without the adjustment of 412 (i.e., in the first illustration 502, much of the beam 510 is transmitted into the ground of the road 506). A second illustration 504 illustrates a direction of the beam 510 with the adjustment of 412. Specifically, in the example of the second illustration 504 of FIG. 5, the beam 510 is adjusted at an angle 512 with respect to the current positioning of the vehicle 10 (front to rear), resulting in the beam 510 being parallel with the upcoming segment of the road 506. As a result, the direction of the beam 510 of the second illustration 504 can potentially provide for improved detection, classification, and tracking of the upcoming segment of the road 506 and objects in proximity thereto.

In one embodiment, with reference to FIG. 4, once the beam is adjusted at 412, the process proceeds to 414 (discussed further below) for further possible adjustment of the beam. In another embodiment, once the beam is adjusted at 412, the process proceeds instead to 402 (as depicted in phantom in FIG. 4) in a new iteration. In either case, if the determination in 410 is that the vehicle tilt (or, in certain embodiments, the rate of change of the vehicle tilt) is less than or equal to the predetermined threshold, the adjustment of 412 is not performed, and the process proceeds instead directly to 414, described directly below.

A determination is made at 414 as to whether the road incline of 404 and/or 408 is greater than a predetermined threshold. In one embodiment, the condition of 414 is satisfied whenever the absolute value of the road incline is greater than the predetermined threshold (i.e., so that this condition is satisfied for both uphill and downhill inclines of sufficient magnitude). With reference to FIG. 6, in one embodiment, the determination at 414 is whether the angle 602 of the upcoming segment 614 of the road 506 is greater than a predetermined threshold. In one embodiment, this determination is made by a processor, such as the processing unit 226 and/or the processor 240 of FIG. 2, using a predetermined threshold stored in the memory 225 and/or the memory 242 (e.g., as a stored value 252) of FIG. 2. In one embodiment, the angle 602 is continuously measured and monitored, and the radar beam direction is continuously changed in order to keep it within desired field of view where the potential obstacles are expected both in elevation and azimuth direction.

If the road incline is greater than the predetermined threshold, then the beam of the radar system 103 is adjusted at 416. In one embodiment, the beam is adjusted by adjusting an amplitude and/or phase of the transmitted and/or received radar signals of the radar system 103 via instructions provided by a processor (such as the processing unit 226 and/or the processor 240 of FIG. 2) so that the beam is formed in a direction consistent with (and in one example, parallel to) the angle of the incline for the upcoming segment of the road in which the vehicle 10 is travelling. In the example of FIG. 6, the beam 510 is adjusted at an upward angle 604 (e.g., with respect to a longitudinal axis of the vehicle) with respect to a current direction of travel of the vehicle 10 when the incline of the road 506 is positive (i.e. uphill). Similarly, if the incline of the road 506 is negative (i.e., downhill), the angle 604 would be downward 604 (e.g., with respect to a longitudinal axis of the vehicle). The adjustment of the beam 510 is implemented in a manner that focuses the beam 510 in the general direction of the inclined road segment ahead, for enhanced detection, classification, and tracking of the upcoming segment of the road 506 and objects in proximity thereto. In one embodiment, the angle 604 is equal to angle 602 of FIG. 6 (i.e. the angle of the beam 510 with respect to the direction of travel of the vehicle 10 is equal to the angle of incline of the road 506).

In one embodiment, once the beam is adjusted at 416, the process proceeds to 418 (discussed further below) for further possible adjustment of the beam. In another embodiment, once the beam is adjusted at 416, the process proceeds instead to 402 (as depicted in phantom in FIG. 4) in a new iteration. In either case, if the determination in 414 is that the road incline is less than or equal to the predetermined threshold, the adjustment of 416 is not performed, and the process proceeds instead to 418, described directly below.

An analysis is made at 418 as to any adjustment of the beam based on the road curvature of 406 and/or 408. In one embodiment, the road curvature is continuously estimated from the vehicle dynamics and monitored, and the radar beam direction is continuously changed in order to keep it within desired field of view where the potential obstacles are expected both in elevation and azimuth direction. With reference to FIG. 7, in one embodiment, the analysis pertains to the measure of curvature 702 of the upcoming segment 714 of the road 506. In one embodiment, the analysis is performed by a processor, such as the processing unit 226 and/or the processor 240 of FIG. 2.

The beam of the radar system 103 is adjusted at 420 based upon the road curvature, incorporating the analysis of 418. In one embodiment, the beam is adjusted by adjusting an amplitude and/or phase of the transmitted and/or received radar signals of the radar system 103 via instructions provided by a processor (such as the processing unit 226 and/or the processor 240 of FIG. 2) so that the beam is formed in a direction consistent with (and preferably parallel to) the angle of the curvature for the upcoming segment of the road in which the vehicle 10 is travelling. In one embodiment, the adjustment is continuous, and incorporates continuous measurements of the road curvature. In the example of FIG. 7, the beam 510 is adjusted at an upward angle 704 604 (e.g., with respect to a longitudinal axis of the vehicle) with respect to a current direction of travel of the vehicle 10. The adjustment of the beam 510 is implemented in a manner that focuses the beam 510 in the general direction of the curved road segment ahead, for enhanced detection, classification, and tracking of the upcoming segment of the road 506 and objects in proximity thereto.

In one embodiment, once the beam is adjusted at 420, the process proceeds to 422 (discussed further below) for further possible adjustment of the beam. In another embodiment, once the beam is adjusted at 420, the process proceeds instead to 402 (as depicted in phantom in FIG. 4) in a new iteration. In either case, if the determination in 418 is that the road curvature is less than or equal to the predetermined threshold, the adjustment of 420 is not performed, and the process proceeds instead to 422, described directly below.

A determination is made at 422 as to whether an object has been detected in proximity to the vehicle 10. In one embodiment, the determination of 422 is whether a measure of proximity between the host vehicle 10 and an object that has been detected, identified, and/or classified at 406 and/or 408 is less than a predetermined threshold. With reference to FIG. 7, in one embodiment, the determination at 420 is whether a distance between the host vehicle 10 and the object 802 is less than a predetermined distance threshold. In another embodiment, the determination at 420 is whether an estimated time of possible impact between the host vehicle 10 and the object 802 (considering the position and movement thereof) is less than a predetermined time threshold. In one embodiment, this determination is made by a processor, such as the processing unit 226 and/or the processor 240 of FIG. 2, using a predetermined threshold stored in the memory 225 and/or the memory 242 (e.g., as a stored value 252) of FIG. 2. In one embodiment, the object detection and related determinations are continuously measured and monitored, and the radar beam direction is continuously changed in order to keep the detected object within the desired field of view both in elevation and azimuth direction.

If an object is detected in proximity to the vehicle 10, then the beam of the radar system 103 is adjusted at 424. In one embodiment, the beam is adjusted by adjusting an amplitude and/or phase of the transmitted radar signals of the radar system 103 via instructions provided by a processor (such as the processing unit 226 and/or the processor 240 of FIG. 2) so that the beam is formed in a direction toward the detected object. In the example of FIG. 8, the beam 510 is adjusted at an angle 804 toward the object 802. By adjusting the beam 510 in the general direction of the object 802, enhanced detection, classification, and tracking of the object 802 may be attained. In certain embodiments, the focusing of the beam may also be dependent upon the size of the object (e.g. in certain embodiments the beam may be focused toward the object only on the further condition that the size of the object is greater than a particular size threshold, for example, which would indicate that the object is a pedestrian, other vehicle, and/or another type of object of particular importance). In addition, in certain embodiments in which multiple targets are detected, the beam 510 is adapted to focus on one target at a time based on the target's threat level (e.g., based on the proximity or time to contact between the object and the vehicle), and the beam is then switched from target to target based on the threat level. Once the beam is adjusted at 424, the process proceeds to 402 in a new iteration.

Conversely, if it is determined in 422 that there is not an object detected in proximity to the vehicle, then a standard beam focus is used at 426. Specifically, in one embodiment, at 426, no adjustment is provided for the radar system beam (rather, the radar system beam would be directed in a standard, default, or most recent previous setting), based on instructions provided by a processor (such as the processing unit 226 and/or the processor 240 of FIG. 2). Accordingly, if no adjustment is called for in 410, 414, 418, or 422, then the amplitude and phase of the transmitted and received radar signals include their standard, default, or most recent previous setting(s), without any adjustment. The process then proceeds to 402 in a new iteration. In one embodiment, the steps of the method 400 repeat so long as the vehicle 10 is being driven, after which the method 400 ends.

With reference to FIG. 9, a flow diagram 900 is provided corresponding to implementation of the process 400 of FIG. 4 in connection with the control system 12 of FIGS. 1-3, in accordance with an exemplary embodiment. In the example of FIG. 9, the beam steering module 228 of the processing unit 226 of FIG. 2 receives information regarding the vehicle tilt from the IMU 234 (for example, corresponding to 402 and/or 408 of the process 400 of FIG. 4). The beam steering module 228 receives information regarding characteristics of the road (e.g., the incline and curvature of the road on which the vehicle 10 is travelling) from the geographic sensor unit 236, and in some embodiments from the detection unit 238, for example from a camera and/or LIDAR after processing of such information via the scene analysis module 227 (for example, corresponding to 404 and/or 408 of the process 400 of FIG. 4). In addition, the beam steering module 228 receives information regarding detected objects (e.g. other vehicles, pedestrians, trees, debris, and so on) in proximity to the host vehicle 10 via the radar signals received by the receivers 222 of the radar system 103 of FIGS. 1-3, and/or from the detection unit 238, for example from a camera and/or LIDAR, after processing of such information via the scene analysis module 227 (for example, corresponding to 406 and/or 408 of the process 400 of FIG. 4).

The beam steering module 228 determines appropriate adjustments to the amplitude and/or phase of the radar signals transmitted and/or received by the radar system 103 of FIGS. 1-3, to thereby adjust the beam of the radar system 103 based on the environment for the vehicle 10 as the vehicle 10 is being operated in a current vehicle drive or ignition cycle (e.g., with respect to the vehicle tilt, the road incline, the road curvature, and the detected objects). The adjustments for the amplitude and/or phase of the radar signals are implemented by the radar CPU module 229 based on instructions provided by the beam steering module 228 to accomplish the overall desired adjustment of the beam for the radar system 103. While FIG. 9 depicts an exemplary embodiment of the flow diagram 900, it will be appreciated that the flow diagram 900 may vary in other embodiments, for example in that these steps may otherwise be implemented by one or more processors, such as the processing unit 226 and/or the processor 240 of FIG. 2.

Methods and systems are provided for controlling radar systems of vehicles. The disclosed methods and systems provide for the adjustment of a beam of the radar system based on an environment for the vehicle, such as a tilt of the vehicle, an incline of the road, a curvature of the road on which the vehicle is travelling, and identified objects in proximity to the vehicle. By adjusting the beam in this manner, this can facilitate a more focused tracking of the road in which the vehicle 10 is travelling and objects in proximity thereto.

It will be appreciated that the disclosed methods, systems, and vehicles may vary from those depicted in the Figures and described herein. For example, the vehicle 10, the radar control system 12, the radar system 103, the controller 104, and/or various components thereof may vary from that depicted in FIGS. 1-3 and described in connection therewith. In addition, it will be appreciated that certain steps of the method 400 may vary from those depicted in FIGS. 4-9 and/or described above in connection therewith. It will similarly be appreciated that certain steps of the method described above may occur simultaneously or in a different order than that depicted in FIGS. 4-9 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for controlling a radar system of a vehicle, the method comprising the steps of:
   receiving, from a sensor, sensor information pertaining to a lateral curvature of an upcoming segment of a road on which the vehicle is travelling as the vehicle is operated; and
   automatically adjusting a beam of the radar system that is transmitted from the vehicle toward the road via the radar system, by forming the beam in a direction that is parallel with a direction of the upcoming segment of the road for transmission from the vehicle toward the road via the radar system based on the lateral curvature of the upcoming segment of the road.

2. The method of claim 1, further comprising:
   determining a tilt of the vehicle using the sensor information,
   wherein the adjusting the beam further comprises adjusting the beam that is transmitted from the vehicle toward the road via the radar system based also on the tilt of the vehicle.

3. The method of claim 1, further comprising:
   identifying an object proximate the vehicle using the sensor information;
   wherein the adjusting the beam further comprises adjusting the beam that is transmitted from the vehicle toward the road via the radar system based also on the identification of the object and a relative location, a relative direction of movement, or both of the object with respect to the vehicle.

4. The method of claim 1, further comprising:
   determining an incline of the road; and
   adjusting the beam that is transmitted from the vehicle toward the road via the radar system also based on the incline of the road.

5. The method of claim 1, wherein the beam is formed based on radar signals transmitted by the radar system, and the step of adjusting the beam further comprises:
   adjusting a phase, an amplitude, or both, of the transmitted radar signals based on the lateral curvature of the upcoming segment of the road.

6. The method of claim 5, wherein the beam is formed also based on radar signals received by the radar system, and the method further comprises:
   adjusting a phase, an amplitude, or both, of the received radar signals based on the lateral curvature of the upcoming segment of the road.

7. The method of claim 1, wherein the beam is formed based on radar signals transmitted and received by the radar system, and the method further comprises:
   adjusting a phase, an amplitude, or both, of the transmitted and received radar signals based on the lateral curvature of the upcoming segment of the road.

8. The method of claim 1, wherein the beam is formed based on radar signals transmitted by the radar system, and the step of adjusting the beam further comprises:
   adjusting a phase and an amplitude of the transmitted radar signals based on the lateral curvature of the upcoming segment of the road.

9. The method of claim 1, wherein the beam is also formed based on radar signals received by the radar system, and the method further comprises:
   adjusting a phase and an amplitude of the received radar signals based on the lateral curvature of the upcoming segment of the road.

10. A control system for a radar system of a vehicle, the control system comprising:
    a sensor array configured to provide sensor information pertaining to an identified object proximate the vehicle as the vehicle is operated and pertaining to a lateral curvature of an upcoming segment of a road on which the vehicle is travelling as the vehicle is operated; and
    a processor coupled to the sensor and configured to adjust a beam of the radar system that is transmitted from the vehicle toward the road via the radar system, by forming the beam in a direction that is parallel with a direction of the upcoming segment of the road for transmission from the vehicle toward the road via the radar system based on the identified object in combination with a relative location and a relative direction of movement with respect to the vehicle and the lateral curvature of the upcoming segment of the road.

11. The control system of claim 10, wherein the sensor information also represents a tilt of the vehicle, and the processor is configured to adjust the beam that is transmitted from the vehicle toward the road via the radar system also based on the tilt of the vehicle.

12. The control system of claim 10, wherein the sensor information also represents an incline of a road on which the vehicle is travelling, and the processor is configured to adjust the beam that is transmitted from the vehicle toward the road via the radar system also based on the incline of the road.

13. A radar system for a vehicle, the radar system comprising:
    an interface configured to obtain sensor information pertaining to a lateral curvature of an upcoming segment of a road on which the vehicle is travelling as the vehicle is operated;
    one or more transmitters and receivers configured to transmit and receive radar signals of the radar system; and
    a processor coupled to the interface and the transmitter and configured to adjust a beam of the radar system that is transmitted from the vehicle toward the road via the radar system, by forming the beam in a direction that is parallel with a direction of the upcoming segment of the road for transmission from the vehicle toward the road via the radar system, and by adjusting a phase, an amplitude, or both of the transmitted or received radar signals based on the lateral curvature of the upcoming segment of the road.

14. The radar system of claim 13, wherein the sensor information also represents a tilt of the vehicle, and the processor is configured to adjust the beam that is transmitted from the vehicle toward the road via the radar system also based on the tilt of the vehicle.

15. The radar system of claim 13, wherein the sensor information also represents an identified object proximate the vehicle, and the processor is configured to adjust the beam that is transmitted from the vehicle toward the road via the radar system also based on the identified object and a relative location and a relative direction of movement of the object with respect to the vehicle.

16. The radar system of claim 13, wherein the sensor information also represents an incline of the road on which the vehicle is travelling, and the processor is configured to adjust the beam that is transmitted from the vehicle toward the road via the radar system also based on the incline of the road.

17. The radar system of claim 13, wherein the processor is configured to adjust a phase and an amplitude, or both of the transmitted radar signals based on the lateral curvature of the upcoming segment of the road.

18. The radar system of claim 13, wherein the processor is further configured to adjust a phase, an amplitude, or both of the received radar signals based on the lateral curvature of the upcoming segment of the road.

19. The radar system of claim 13, wherein the processor is configured to adjust a beam of the radar system by adjusting a phase, an amplitude, or both of the transmitted and received radar signals based on the lateral curvature of the upcoming segment of the road.

20. The radar system of claim 19, wherein the processor is configured to adjust the beam of the radar system by adjusting the phase and the amplitude of both the transmitted and received radar signals based on the lateral curvature of the upcoming segment of the road.

* * * * *